United States Patent [19]
Mano

[11] 3,984,874
[45] Oct. 5, 1976

[54] HIGH DENSITY MAGNETIC RECORDING AND REPRODUCING SYSTEM

[75] Inventor: Yujiro Mano, Tokyo, Japan

[73] Assignee: TDK Electronic Company, Tokyo, Japan

[22] Filed: Nov. 18, 1974

[21] Appl. No.: 524,817

[30] Foreign Application Priority Data
Nov. 20, 1973 Japan............................. 48-130501

[52] U.S. Cl. ............................................. 360/119
[51] Int. Cl.² ........................................... G11B 5/25
[58] Field of Search....................... 360/119, 120, 55

[56] References Cited
UNITED STATES PATENTS
3,313,889  4/1967  Machinski........................... 360/119
3,662,361  5/1972  Mee..................................... 360/119
3,683,407  8/1972  Paul et al.............................. 360/55

*Primary Examiner*—Robert S. Tupper
*Attorney, Agent, or Firm*—Oblon, Fisher, Spivak, McClelland & Maier

[57] ABSTRACT

A magnetic recording and reproducing system having a magnetic head wherein a thickness of an edge of a head gap of a head core is smaller than a width of the head gap, and means for recording and reproducing a magnetic recording medium by the magnetic head in a direction of magnetization which is a perpendicular or slant direction to the direction of movement of the magnetic recording medium.

3 Claims, 5 Drawing Figures

HIGH DENSITY MAGNETIC RECORDING AND REPRODUCING SYSTEM

BACKGROUND OF THE INVENTION

1. Field of the Invention

The present invention relates to a short wave magnetic recording and reproducing system which can remarkably improve the recording density by arranging a magnetic head such that the direction of magnetization is of a perpendicular or slant direction to the direction of movement of a magnetic recording medium.

2. Description of the Prior Art

FIGS. 1 – 3 illustrate the principles of a conventional magnetic recording and reproducing system.

In FIGS. 1 – 3 a magnetic layer surface of a magnetic reproducing medium 1 is prepared by coating a magnetic layer 3 on a base 2. The magnetic layer surface 3 is positioned to face a magnetic head 4 which is prepared by winding a coil 6 on a core 5 such that the direction of magnetization generated by the coil 6 in a head gap 7 of the magnetic head 4 is arranged in the direction of movement (arrow line) of the magnetic recording medium 1.

In order to record a high frequency signal in the direction of movement of the magnetic recording medium with a high density, it is necessary to decrease the width g of the head gap 7 of the magnetic head 4 or to increase the relative velocity of the recording medium 1 to the magnetic head 4, that is the recording velocity.

In the magnetic head 4, the width g of the head gap 7 can be decreased only to a certain limit. Because of a mechanical work processing, the minimum width g of the head gap 7 may in practice be about 0.6 – 1.0 $\mu$m.

The ratio of $a/b$ [$a$ = length of magnetization on the recording medium 1 that is the width of the gap $g$ ($a = g$) and $b$ = width of a track that is the width $w$ of the core 5 ($b = w$)] is decreased upon the decreasing of the width of the gap $g$ that is the length of magnetization on the recording medium. However, by decreasing the width of the gap $g$, the self-demagnetization caused by a diamagnetic field is increased to disadvantageously and remarkably attenuate the reproducing output.

With regard to other losses possible in a short wave recording system, it should be noted that the ratio of $a/l$ ($a$ = length of magnetization and $l$ = distance between the reproducing head 4 and the recording medium 1) is decreased upon the decreasing of the length of magnetization as shown in FIG. 2, whereby the magnetic flux leakage is small and the magnetic flux crossed to the reproducing head 4 is small and the reproducing output is decreased as a spacing loss. Accordingly, in order to record with high density, the recording velocity should be increased. However, it is not easy to move a recording medium such as a magnetic tape having flexibility and elasticity at a high velocity without fluctuation.

SUMMARY OF THE INVENTION

Accordingly, it is an object of the present invention to provide a new and improved unique high frequency and high density magnetic recording and reproducing system.

Briefly, in accordance with the present invention, the foregoing and other objects are attained by providing a magnetic recording and reproducing system which includes a magnetic head wherein a thickness of an edge of a head gap of a head core is smaller than a width of the head gap, and means for recording and reproducing a magnetic recording medium by the magnetic head in a direction of magnetization which is a perpendicular or slant direction to the direction of movement of the magnetic recording medium.

BRIEF DESCRIPTION OF THE DRAWINGS

A more complete appreciation of the invention and many of the attendant advantages thereof will be readily apparent as the same becomes better understood by reference to the following detailed description when considered in connection with the following drawings, wherein.

DETAILED DESCRIPTION OF THE PREFERRED EMBODIMENT

Figure 1:
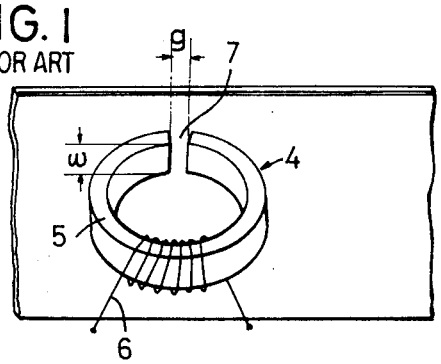
FIG. 1 is a schematic view showing the principles of a conventional magnetic recording and reproducing system.
Figure 2:
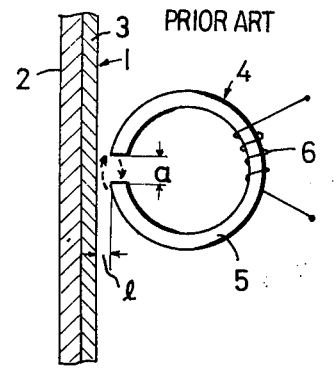
FIG. 2 is a sectional view of the system of FIG. 1.
Figure 3:
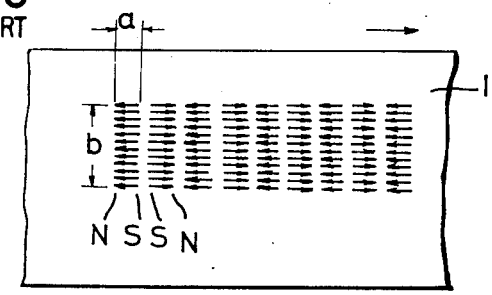
FIG. 3 is a schematic view showing the state of magnetization of the conventional system.
Figure 4:
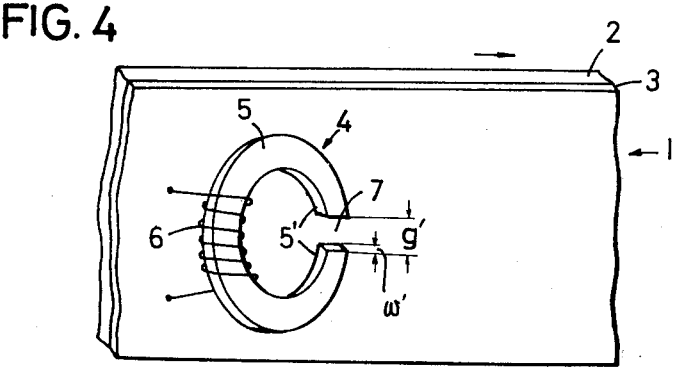
FIG. 4 is a schematic view of the magnetic recording and reproducing system according to the present invention.
Figure 5:
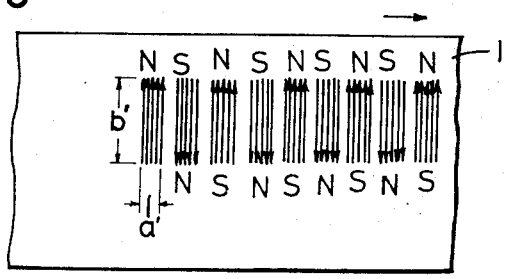
FIG. 5 is a schematic view showing the state of magnetization of the present invention.

The magnetic recording and reproducing system of the present invention will now be illustrated by referring to FIGS. 4 and 5, wherein like reference numerals designate identical or corresponding parts to those of FIGS. 1 – 3.

In FIG. 4, when the magnetic head 4 is positioned to face the surface of the magnetic layer 3 of the recording medium 1, the direction of magnetization generated by the coil 6 in the head gap 7 of the magnetic head 4, that is the direction of magnetization of the magnetic layer 3 is arranged to be perpendicular or of a slant direction to the direction of movement of a magnetic recording medium (arrow line). In the magnetic head 4, the thickness $w'$ of the edge 5' of the gap of the head core 5 is thinner than the width $g'$ of the head gap 7. The state of magnetization on the magnetic layer 3 resulting from the magnetic head 4 is perpendicular (or slant) to the direction of movement of the recording medium 1 as shown in FIG. 5. The slant is usually 30° to 60° and preferably about 45°, though the perpendicular positioning is optimum. The width of magnetization $a'$ ($a' = w'$) is less than the width of the track that is the length of magnetization $b'$ ($b' = g'$). In accordance with the system of the present invention, the length of the magnetization $b'$ is high even though the recording frequency is high and the recording velocity is slow. The length of the magnetization $b'$ can be constant regardless of the frequency and only the adjacent magnetization becomes dense in the direction of movement of the recording medium 1. Since the length of magnetization is constant with the present invention, the spacing loss in the reproduction is quite small regardless of the frequency, and the reproducing output is not decreased. In high density recording according to the present invention, the density of adjacent magnetization is dense, whereby a closed magnetic flux circuit is formed by the magnetization, and accordingly the self-demagnetization caused by high density is not found.

Also, with the present invention it is unnecessary to narrow the gap 7 by decreasing the thickness of the magnetic head, as is the case of the conventional system, whereby a magnetic head suitable for recording with high density recording to high frequency region can be attained by using the magnetic head even though the recording velocity is slow.

In the magnetic recording and reproducing system it should be understood that the intensity and density of the magnetization on the magnetic recording medium can be decided conventionally as disclosed, for example, in the IEEE Transactions on Magnetics, Vol. Mag.—5 No. 4, Page 821, December 1969.

Moreover, it should be apparent that while in the drawing the magnetic head is shown as having a single core and winding, it is possible to use any type magnetic head, and it is usual to use a magnetic head composed of two head cores wound by windings with the edges of the head cores being faced to form the magnetic gap. Conventional magnetic heads are disclosed in, for example, "Tape Record" by Tsunoo, Page 134, published by Nikkan Kogyo Newspaper K.K., April 1971. The conventional magnetic heads have a magnetic head core with $a = 2$ $\mu$m, $b = 100$ $\mu$m and $a/b = 0.02$. The magnetic head of the present invention has a magnetic head core $a' = 0.05 - 5$ $\mu$m; $b' = 0.1 - 10$ $\mu$m; and $a'/b' = 0.05 - 50$; $l =$ less than 0.3 $\mu$m and $a'/l' = 1.7 - 17$.

Obviously, numerous modifications and variations of the present invention are possible in light of the above teachings. It is therefore to be understood that within the scope of the appended claims, the invention may be practiced otherwise than as specifically described herein.

What is claimed as new and desired to secured by Letters Patent of the United States is:

1. A magnetic recording and reproducing system comprising:
    a magnetic tape,
    a magnetic head disposed adjacent to the magnetic tape and being separated from the magnetic tape by a distance $l'$,
    the magnetic head comprising:
    a magnetic core having a gap $g'$ therein, the gap being disposed adjacent to the magnetic tape,
    a coil wrapped about the magnetic core,
    the magnetic core having two edges which define the gap, each edge having a thickness $w'$,
    the magnetic head being disposed with respect to the magnetic tape so that a line joining the two edges of the magnetic core which define the gap intersects at a substantial angle a line defining the direction of movement of the magnetic tape,
    $w'$ divided by $g'$ being equal to $0.05 - 0.5$,
    $l'$ being less than 0.3 $\mu$m and
    $w'$ divided by $l'$ being equal to $1.7 - 17$.
    less than 0.3 $\mu$m and $w'$ divided by $l'$ being equal to $1.7 - 17$.

2. A magnetic recording and reproducing system in accordance with claim 1, wherein the magnetic head is disposed with respect to the magnetic tape so that a line joining the two edges of the magnetic core which define the gap intersects at a 90° angle a line defining the direction of movement of the magnetic tape.

3. A magnetic recording and reproducing system in accordance with claim 1, wherein the magnetic head is disposed with respect to the magnetic tape so that a line joining the two edges of the magnetic core which define the gap intersects at a 45° angle a line defining the direction of movement of the magnetic tape.

* * * * *

UNITED STATES PATENT AND TRADEMARK OFFICE
CERTIFICATE OF CORRECTION

PATENT NO. : 3,984,874
DATED : October 5, 1976
INVENTOR(S) : Yujiro Mano

It is certified that error appears in the above–identified patent and that said Letters Patent are hereby corrected as shown below:

Column 4, Claim 1, after line 17, insert:

--$w'$ being equal to 0.5-5 $\mu m$, $g'$ being equal to 0.1-10 $\mu m$,--

Column 4, Claim 1, delete lines 21 and 22.

Signed and Sealed this

First Day of February 1977

[SEAL]

Attest:

RUTH C. MASON
Attesting Officer

C. MARSHALL DANN
Commissioner of Patents and Trademarks